L. ALVERSON.
STANDARD FENCE STAY ANCHOR ROD AND LIGHTNING ROD.
APPLICATION FILED AUG. 14, 1916.
1,222,255.
Patented Apr. 10, 1917.
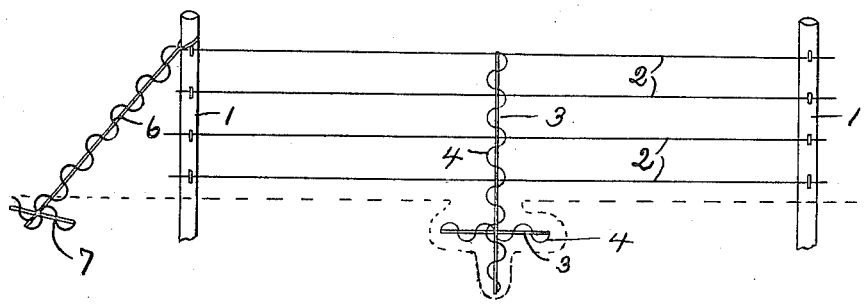
Inventor,
Lewis Alverson.
By A. D. Jackson
Attorney

UNITED STATES PATENT OFFICE.

LEWIS ALVERSON, OF OMAHA, NEBRASKA.

STANDARD FENCE-STAY ANCHOR-ROD AND LIGHTNING-ROD.

1,222,255.   Specification of Letters Patent.   Patented Apr. 10, 1917.

Application filed August 14, 1916. Serial No. 114,912.

*To all whom it may concern:*

Be it known that I, LEWIS ALVERSON, a citizen of the United States, residing at Omaha, in the county of Douglas and State of Nebraska, have invented certain new and useful Improvements in Standard Fence-Stay Anchor-Rods and Lightning-Rods, of which the following is a specification.

My invention relates to stays for maintaining strands or line wires of fences and other structures in fixed positions, and means for conducting lightning down into the earth and for other purposes, and the object is to provide a simple retaining device which will be inexpensive to manufacture and which can be used for various purposes as for retaining the line wires of fences in fixed positions to prevent sagging or straining out of position by animals trying to pass through the fences; to provide a lightning conductor to take the lightning from line wires and conduct the same into the earth; to provide an absolute anchor for fence posts and other objects; and for holding line wires of fences at any desirable positions whether in straight lines or bent to conform to uneven surfaces of the ground so that the line wires can be held in any desired position relative to the ground. Other objects and advantages will be fully explained in the following description and the invention will be more particularly pointed out in the claim.

Reference is had to the accompanying drawing which forms a part of this application.

The figure of drawing shows a section of fence with the stay used as a lightning rod as well as a stay anchored in the ground and also showing a stay anchoring a fence post to the ground.

Similar characters of reference are used to indicate the same parts throughout the drawing.

The stay herein shown is adapted for use on various structures of fence and for other purposes. A section of fence including posts 1 and line wires 2 is shown in the drawing, a stay is shown composed of a straight member 3 and a spiral member 4 coiled about the straight member 3. This stay is shown in the drawing used as a lightning rod and extends to a considerable depth in the ground and engages a similar stay which is horizontally disposed in the earth and which is used as an anchor for retaining the first mentioned stay in place and for scattering electricity in the earth, in other words for grounding currents of electricity. Another stay 6 is shown for anchoring one of the posts 1. This anchoring stay 6 engages a post 1 and a similar stay 7 which is buried in the ground for retaining the anchoring stay 6 in place.

It is apparent that any number of stays can be used with each section of the fence.

The manner of using the fence stay is to commence at the top line of wire 2 catching the line wire between the straight member of the stay and the spiral member, then twisting or rotating the stay which will cause the stay to descend and care must be taken to catch each line wire between the straight member and the spiral member as the stay is rotated. The stay will force itself down merely by rotating the same. When the stay has reached the limit, that is when the juncture of the spiral member and the straight member descend to the top line wire, the stay is mounted and will hold the line wires against upward or downward movement because the line wires 2 force the curve or spiral member off of the straight member. The line wires will thus be held in place in the bends of the spiral member.

The vertical stay 3, 4 is made to engage the horizontal stay in the same manner as the vertical stay engages the horizontal line wires 2. The stay 3, 4 is screwed down catching the horizontal stay between the straight member 3 and the spiral member 4 and extended far enough below the horizontal stay to make a secure attachment thereto.

What I claim is,—

As an article of manufacture, fence post and line anchoring stays, one member including a straight body member and a spiral member coiled about the straight member and inclosing all line wires of a fence between it and said straight member and the other member including similar body and spiral members buried in the earth, and the first mentioned member being extended down to and engaging said buried member between the straight and spiral members.

In testimony whereof, I set my hand this 17th day of March, 1916.

LEWIS ALVERSON.

Copies of this patent may be obtained for five cents each, by addressing the "Commissioner of Patents, Washington, D. C."